United States Patent [19]

Studenny

[11] Patent Number: 5,014,063

[45] Date of Patent: May 7, 1991

[54] INTEGRATED ALTIMETER AND DOPPLER VELOCITY SENSOR ARRANGEMENT

[75] Inventor: John Studenny, Montreal, Canada

[73] Assignee: Canadian Marconi Company, Montreal, Canada

[21] Appl. No.: 463,415

[22] Filed: Jan. 11, 1990

[51] Int. Cl.⁵ .............................................. G01S 13/38
[52] U.S. Cl. .................................. 342/130; 342/122; 342/109
[58] Field of Search ............... 342/130, 109, 111, 112, 342/120, 121, 122

[56] References Cited

U.S. PATENT DOCUMENTS

| | | | |
|---|---|---|---|
| 3,120,659 | 2/1964 | Wells et al. | 342/130 |
| 3,239,837 | 3/1966 | Fried | 342/99 |
| 3,611,370 | 10/1971 | Frasure et al. | 342/82 |
| 3,860,925 | 1/1975 | Darboven, Jr. | 342/109 |
| 4,044,354 | 8/1977 | Bosher et al. | 342/124 |
| 4,079,377 | 3/1978 | zur Heiden et al. | 342/109 |
| 4,241,347 | 12/1980 | Albanese et al. | 342/89 |
| 4,292,637 | 9/1981 | Johnson | 342/44 |
| 4,302,758 | 11/1981 | Tomasi | 342/87 |
| 4,328,495 | 5/1982 | Thue | 342/109 |
| 4,594,676 | 6/1986 | Breiholz et al. | 342/109 X |
| 4,744,040 | 5/1988 | Kawata et al. | 364/561 |
| 4,806,935 | 2/1989 | Fosket et al. | 342/120 |
| 4,812,035 | 3/1989 | Freedman et al. | 356/5 |

Primary Examiner—Thomas H. Tarcza
Assistant Examiner—John B. Sotomayor
Attorney, Agent, or Firm—Fishman, Dionne & Cantor

[57] ABSTRACT

A transmitter section of the arrangement includes an altimeter transmitter and a Doppler transmitter. The transmitters both provide frequency-modulated outputs. The altimeter transmitter is linear-FM while the Doppler transmitter is sine-FM.

7 Claims, 2 Drawing Sheets

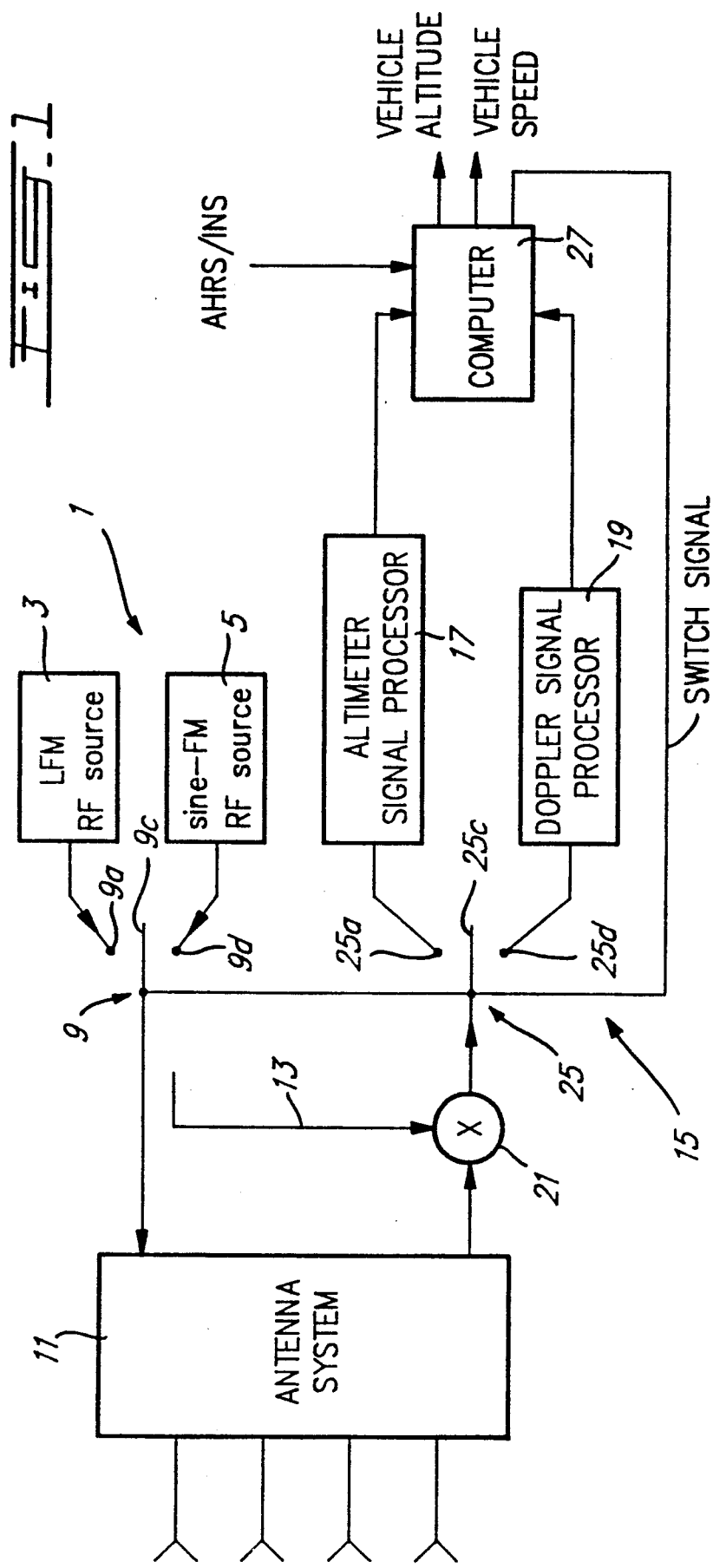

INTEGRATED ALTIMETER AND DOPPLER VELOCITY SENSOR ARRANGEMENT

BACKGROUND OF THE INVENTION

1. Field of the Invention

The invention relates to an integrated altimeter and Doppler velocity sensor arrangement for use in an airborne vehicle. More specifically, the invention relates to such an arrangement which uses one waveform for the altimeter function and a different waveform for the Doppler velocity sensor function.

2. Description of Prior Art

Integrated ground speed and altimetery measuring instruments are known in the prior art as illustrated in, for example, U.S. Pat. No. 3,239,837, Fried, Mar. 8, 1966, U.S. Pat. No. 3,611,370, Frasure et al, Oct. 5, 1971, U.S. Pat. No. 3,860,925, Darboven, Jr., Jan. 14, 1975, U.S. Pat. No. 4,806,935, Fosket et al, Feb. 21, 1989, and U.S. Pat. No. 4,594,676, Breiholz et al, June 10, 1986.

The '837 patent teaches an integrated ground speed and altimetry measuring instrument. However, the transmitted wave in the '837 patent is modulated by a single modulator. Separate channels are used in the receiver for providing ground speed and altimetry outputs.

The '370 patent also teaches an integrated Doppler and altimeter radar. In the '370 patent, the transmitter is arranged for operation in either the ICW (interrupted continuous wave) mode or FM-CW mode. The radar must operate.

In the '925 patent, the system is sine-FM modulated. However, in the '925 patent, altimetry data is extracted from the frequency-modulated Doppler system. It does not employ a separate modulating wave whose data is "corrected" by the Doppler data.

The '935 patent is an improvement of the system in the '925 patent. The '935 patent uses a closed loop operation of signal processing portions for reflected signals including phase shift information. Once again, it does not teach closer to the present invention than the '925 patent.

The '676 patent is presented as of interest only in that it teaches an FM-CW radar altimeter whose output is used to calculate ground speed.

Other radar techniques exist for range and velocity determination, and it is well known that a waveform can be chosen to estimate either range or velocity with high accuracy. It is also well known that it is not possible to simultaneously perform these measurements well with one waveform while still obtaining high accuracy. It has been proven that such a waveform does not exist. However, modern research looks for rather esoteric waveforms that offer the best possible compromise for a given situation.

SUMMARY OF INVENTION

It is therefore an object of the invention to provide an arrangement which overcomes the disadvantages of the prior art.

It is a more specific object of the invention to provide a compromise solution which combines the altimetry function using one waveform and the Doppler navigation sensing function using a different waveform.

In accordance with a particular embodiment of the invention, the altimetry function uses linear-FM modulation and the Doppler navigation sensor uses sine-FM modulation.

Accordingly, in accordance with a particular embodiment of the invention there is provided an integrated altimeter and Doppler velocity sensor arrangement in which the altimetry function uses linear-FM modulation and in which the Doppler navigation sensing function uses sine-FM modulation.

In accordance with the invention, the two different waveforms are used in a sequential order.

In accordance with the invention there is provided an integrated altimeter and Doppler velocity sensor arrangement for use in an airborne vehicle, comprising:

a transmitter section including an altimeter transmitter and a Doppler transmitter;

altitude modulator means for frequency-modulating said altimeter transmitter to produce an altimeter frequency-modulated transmission signal;

Doppler modulator means for frequency-modulating said Doppler transmitter to produce a Doppler frequency-modulated transmission signal;

a transmitting and receiving antenna system;

first means for connecting said altimeter transmitter and said Doppler transmitter to said antenna system in a predetermined Doppler cycle/altimeter cycle sequence;

whereby, said altimeter frequency-modulated transmission signal and said Doppler frequency-modulated transmission signal are transmitted, in said predetermined sequence, from said antenna system;

a receiver section, including:

mixer means having two inputs and one output, one of said inputs being coupled to said antenna system to receive return signals therefrom in said predetermined sequence;

coupler means having an input and an output, said input being connected to said first means for connecting and said output being connected to the other input of said mixer means whereby to provide said altimeter frequency-modulated transmission signal and said Doppler frequency-modulated transmission signal to said other input of said mixer means in said predetermined Doppler cycle/altimeter cycle sequence;

an altimeter signal processor having an input and an output and a Doppler signal processor having an input and an output;

second means for connecting said output of said mixer means to said input of said altimeter signal processor and said input of said Doppler signal processor in said predetermined Doppler cycle/altimeter cycle sequence;

said first means for connecting and said second means for connecting being ganged for synchronous operation;

said outputs of said signal processors being connected to a computer means;

wherein, said altimeter frequency-modulated transmission signal is different from said Doppler frequency-modulated transmission signal.

BRIEF DESCRIPTION OF DRAWINGS

The invention will be better understood by an examination of the following description, together with the accompanying drawings, in which:

FIG. 1 illustrates the inventive system in block diagram form;

DESCRIPTION OF PREFERRED EMBODIMENTS

Figure 2A:
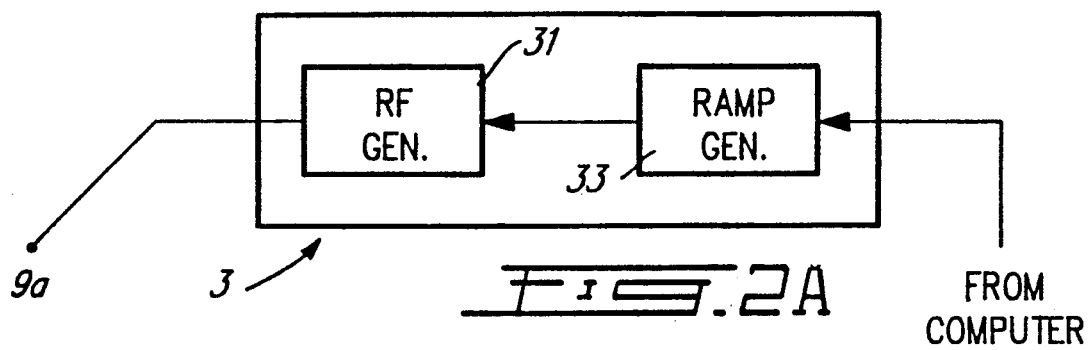
FIGS. 2A and 2B illustrate, in greater detail, the altimeter transmitter and the Doppler transmitter respectively of FIG. 1.

Referring to the drawings, the arrangement in accordance with the invention, which is carried in an airborne vehicle, includes a transmitter section, illustrated generally at 1, and comprising an altimeter transmitter 3 which provides a linear-FM output, and a Doppler transmitter 5 which provides a sine-FM output. The outputs of the altimeter transmitter and the Doppler transmitter are connected, in sequence, through switch 9, to an antenna system 11. The antenna system will preferably comprise a beam-forming network to form a plurality of beams at different vertical angles as illustrated, for example, in FIG. 2 of U.S. Pat. No. 3,860,925. In accordance with the invention, four beams would be formed instead of three illustrated in the '925 patent.

The arrangement also includes a receiver section 15 having an altimeter signal processor 17 and a Doppler signal processor 19. Return signals from the antenna system are fed to one input of a mixer 21. A second input of the mixer is fed the transmitted signal through coupler 23.

The output of the mixer is fed, through switch 21, in sequential arrangement, to the altimeter signal processor 17 and the Doppler signal processor 19. As can be seen, switches 9 and 25 are ganged for synchronized operation so that, when arm 9c is connected to terminal 9a, arm 25c is connected to terminal 25a, and when arm 9c is connected to terminal 9d, arm 25c is connected to terminal 25d.

The outputs of the processors 17 and 19 are fed to a computer 27.

The computer 27 is also provided with data from an Altitude and Heading Reference System/Inertial Navigation System (AHRS/INS). One output of the computer is fed to switches 9 and 25 to control their operation, while a second output of the computer is fed to the altimeter transmitter 3 for reasons to be explained below.

Figure 2B:
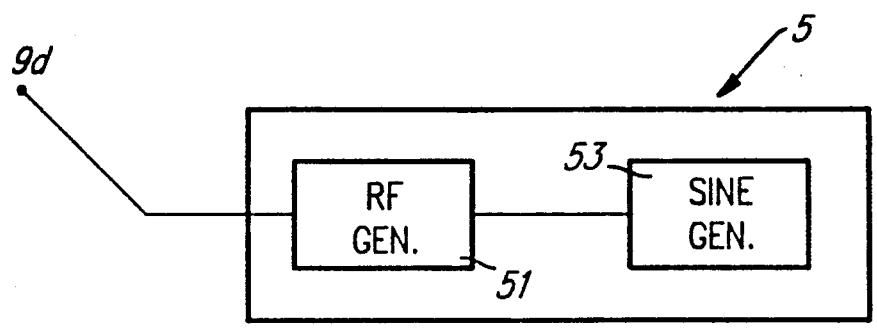

Turning now to FIGS. 2A and 2B, it can be seen that the altimeter transmitter comprises an RF generator 31 and a modulator 33 comprising a ramp generator. The Doppler transmitter similarly comprises an RF generator 51 and a modulator comprising a sinewave generator.

Figure 3A:
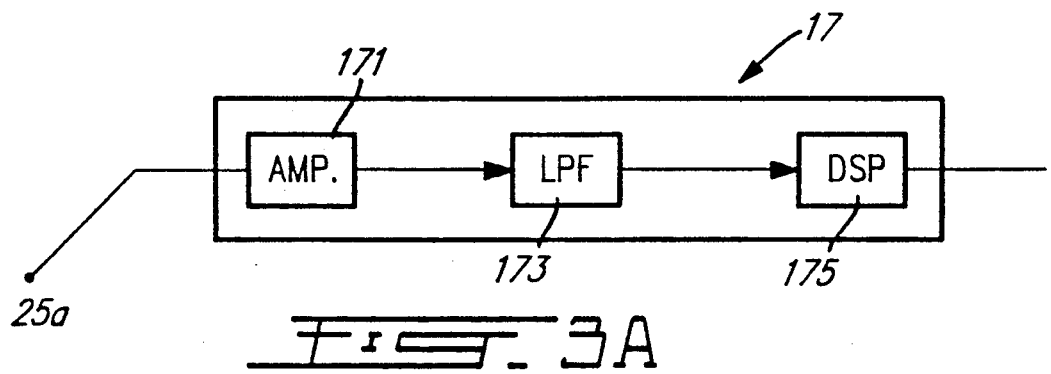
FIGS. 3A and 3B illustrate, in greater detail, the altimeter signal processor and the Doppler signal processor respectively of FIG. 1.
Figure 3B:
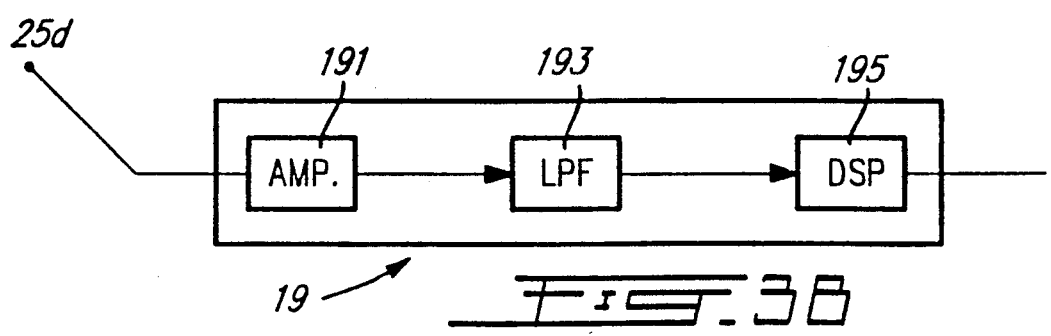

Turning to FIGS. 3A and 3B, the altimeter signal processor comprises an amplifier 171, a low-pass filter 173 and a DSP (digital signal processor) 175. The DSP is a chip, such as a Texas Instrument TMS 320C25, which performs Fast Fourier Transforms (FFTs) at a very speedy rate. Obviously, if the computer were fast enough, then the DSPs would not be required in the processors.

The Doppler signal processor similarly includes an amplifier 191, low-pass filter 193, and a DSP 195.

In operation, the computer 27 will control switches 9 and 25 to sequentially perform a Doppler cycle followed by an altimeter cycle followed by a Doppler cycle etc. Typically, in a Doppler cycle, a sine-FM wave is transmitted along each beam of the antenna system, and the return signal from each transmitted signal is received by the receiver to provide data for calculating the Doppler shift $w_D$ as described in, for example, U.S. Pat. No. 3,860,925. In the altimeter cycle, a linear-FM wave is transmitted along a preselected single beam of the antenna system, and the return signal provides data for calculating the altitude of the aircraft. As the obtained data in the altimeter cycle includes a Doppler shift which cannot be separated from the data, as will be seen below, the Doppler shift calculated in the Doppler cycle is subtracted from the calculated value of the altimeter cycle. The Doppler shift calculated by the Doppler cycle is a very good estimate of the Doppler shift of the altimeter cycle.

The calculated value of the altimeter cycle is the distance along the transmitted beam from the airborne vehicle to the ground. As the altitude of the airborne vehicle is the vertical distance from the airborne vehicle to the ground, the calculated distance must be multiplied by the cosine of the angle between the antenna beam and the local vertical. This latter calculated value must also be modified to take into account the angle of pitch and the angle of roll of the aircraft. It is for this purpose that the computer is provided with the AHRS/INS input.

In the Doppler navigation system, the Doppler frequency shifts are scaled into vehicle velocity with respect to the ground and vehicle co-ordinates. In a similar fashion, the AHRS or INS data allow for conversion of velocity from vehicle co-ordinates to local level earth co-ordinates. This is also described in the Fried patent and is well known.

In the altimeter cycle, the linear-FM transmitter produces the following transmitted waveform:

$$T(t) = \sin(w_c * t + u/2 * t^{**}2)$$

where:
 $w_c$ = carrier frequency
 u = linear-FM sweep rate
 $t^{**}2$ = is understood to be the algebraic square of t $$freq = \frac{d}{dt}(w_c * t + u/2 * t^{**}2) = w_c + u * t$$

Considering the case of no Doppler shift, the received waveform is:

$$R(t) = \sin(w_c * (t-T) + u/2 * (t-T)^{**}2)$$

where:
 T = total, 2-way propagation time. then mixed in the mixer 21 and applied to amplifier 171 and low-pass filter 173. The output of the low-pass filter is:

$$X(t) = \sin((u*T)*t)$$

$w_r = u*T$ = beat frequency due to range and $$range = \frac{w_r}{2*c*u} = \frac{T}{2*c}$$

where:
 c = velocity of light.

The DSP hardware estimates $w_r$ as it does for the Doppler frequency, and the parameter u is known. Therefore, computation of the range is explicit.

The above is all well known, however, complications arise when there is a Doppler frequency shift. be separated out from the range as calculated above.

To solve this problem, we consider the case when there is a Doppler shift whereupon the received signal will be:

$$R(t) = \sin((w_c + w_D)*(t-T) + u/2*(t-T)**2)$$

where:

$w_D$ = Doppler frequency shift of the carrier.

The Doppler shifted received wave is mixed with the transmitted wave in the mixer 21 and fed to the amplifier 171 and the low-pass filter 173. The output of the low-pass filter is:

$$A(t)\sin((w_D + u*T)*t)$$

where:

$W_b = W_D + u*T =$ altimeter beat frequency.

In order to remove the Doppler shift from the above calculation, the computer performs the following calculation using the value of the Doppler shift wD which is already stored in its memory after having performed calculations during the Doppler cycle:

$$\text{range} = \frac{w_b - |w_D|}{2*c*u} = \frac{w_r}{2*c*u} = \frac{T}{2*c}$$

ONLY IF $w_b = u*T + |w_D|$

The ramp generator 33 can be controlled to provide either a positive (increasing frequency) slope or a negative slope. The control is effected by the computer 27. The selection of a positive or negative slope affects whether the "ONLY IF" condition is satisfied to ensure that this condition is always satisfied in accordance with the following rules which MUST be followed: RULE:

a. If the Doppler frequency shift is negative, then use the positive slope ramp.

b. If the Doppler frequency shift is positive, then use the negative slope ramp.

If this rule is used, then the altimeter beat frequency will always be:
$w_b = u*T + |w_D|$ where $|w_D|$ denotes the absolute value of $w_D$. Therefore, the frequency component due to the range will always be:
$u*T = w_r = w_b - |w_D|$.

To ensure that the rules are followed, the computer is programmed to sense the polarity (+ve or -ve) of the Doppler shift determined during the Doppler cycle, and to control ramp generator 33 to provide a positive ramp when the Doppler shift is negative, and to provide a negative ramp when the Doppler shift is positive.

Although a particular embodiment has been described, this was for the purpose of illustrating, but not limiting, the invention. Various modifications, which will come readily to the mind of one skilled in the art, are within the scope of the invention as defined in the appended claims.

I claim:

1. An integrated altimeter and Doppler velocity sensor arrangement for use in an airborne vehicle, comprising:

a transmitter section including an altimeter transmitter and a Doppler transmitter;

altitude modulator means, comprising a linear-FM modulator, for frequency-modulating said altimeter transmitter to produce an altimeter frequency-modulated transmission signal;

Doppler modulator means, comprising a sine-FM modulator, for frequency-modulating said Doppler transmitter to produce a Doppler frequency-modulated transmission signal;

a transmitting and receiving antenna system;

first means for connecting said altimeter transmitter and said Doppler transmitter to said antenna system in a predetermined Doppler cycle/altimeter cycle sequence;

whereby, said altimeter frequency-modulated transmission signal and said Doppler frequency-modulated transmission signal are transmitted, in said predetermined sequence, from said antenna system;

a receiver section, including:

mixer means having two inputs and one output, one of said inputs being coupled to said antenna system to receive return signals therefrom in said predetermined sequence;

coupler means having an input and an output, said input being connected to said first means for connecting and said output being connected to the other input of said mixer means whereby to provide said altimeter frequency-modulated transmission signal and said Doppler frequency-modulated transmission signal to said other input of said mixer means in said predetermined Doppler cycle/altimeter cycle sequence;

an altimeter signal processor having an input and an output and a Doppler signal processor having an input and an output;

second means for connecting said output of said mixer means to said input of said altimeter signal processor and said input of said Doppler signal processor in said predetermined Doppler cycle/altimeter cycle sequence;

said first means for connecting and said second means for connecting being ganged for synchronous operation;

said outputs of said signal processors being connected to a computer means;

wherein, said altimeter frequency-modulated transmission signal is different from said Doppler frequency-modulated transmission signal.

2. An arrangement as defined in claim 1 wherein said altimeter transmitter comprises a first CW generator and said linear-FM modulator whereby to provide a linearly frequency-modulated transmission signal at said altimeter transmitter;

and wherein said Doppler transmitter comprises a second CW generator and said sine-FM modulator whereby to produce a sinusoidally frequency-modulated transmission signal at said Doppler transmitter.

3. An arrangement as defined in claim 2 wherein said first means for connecting comprises a first switching means having two connection terminals and an output terminal, said first connection terminal of said first switching means being connected to said altimeter transmitter and said second connection terminal of said first switching means being connected to said Doppler transmitter which is connected to said antenna system.

4. An arrangement as defined in claim 3 wherein said altimeter signal processor comprises a first lowpass filter having an input terminal and an output terminal and a first digital signal processor having an input terminal and an output terminal; and wherein said Doppler signal processor comprises a second low-pass filter having an input terminal and an output terminal and a second digital signal processor having an input terminal and an output terminal;

said output terminal of said first low-pass filter being connected to said input terminal of said first digital signal processor; and said output terminal of said second low-pass filter being connected to said input terminal of said second digital signal processor.

5. An arrangement as defined in claim 4 wherein said second means for connecting comprises a second switching means having an input terminal, a first connection terminal and a second connection terminal; and wherein said computer comprises a first input terminal and a second input terminal;

said output of said mixer means being connected to said input terminal of said second switching means;

said first connection terminal of said switching means being connected to said input terminal of said first low-pass filter; and said second connection terminal of said second switching means being connected to said input terminal of said second low-pass filter;

said output terminal of said first digital signal processor being connected to said first input terminal of said computer; and said output terminal of said second digital signal processor being connected to said second input terminal of said computer.

6. An arrangement as defined in claim 5 wherein said computer has a first output terminal and a second output terminal; and wherein said first means for connecting comprises a first control terminal and wherein said second means for connecting comprises a second control terminal;

said first output terminal of said computer being connected to said first and second control terminals;

whereby, said computer controls said predetermined sequence.

7. An arrangement as defined in claim 6 wherein said computer comprises means for sensing whether said Doppler shift is a positive Doppler shift or a negative Doppler shift;

said ramp generator comprising a control terminal whereby to control whether the ramp is positive or negative going;

said second output terminal of said computer being connected to said control terminal of said ramp generator;

whereby, when said computer senses a negative Doppler shift, it controls the ramp generator to provide a positive ramp, and, when said computer senses a positive Doppler shift, it controls said ramp generator to provide a negative going ramp.

* * * * *